(12) United States Patent
Snyder et al.

(10) Patent No.: US 10,917,846 B2
(45) Date of Patent: *Feb. 9, 2021

(54) LOW POWER WIRELESS COMMUNICATION DEVICE AND REMOTE MANAGEMENT TECHNIQUES

(71) Applicant: Cisco Technology, Inc., San Jose, CA (US)

(72) Inventors: Ian M. Snyder, San Francisco, CA (US); Morgan Teachworth, Campbell, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,783

(22) Filed: May 21, 2018

(65) Prior Publication Data

US 2018/0270754 A1 Sep. 20, 2018

Related U.S. Application Data

(63) Continuation of application No. 15/012,461, filed on Feb. 1, 2016, now Pat. No. 9,980,220.

(51) Int. Cl.
*H04W 52/02* (2009.01)
(52) U.S. Cl.
CPC ... *H04W 52/0212* (2013.01); *H04W 52/0216* (2013.01); *Y02D 30/70* (2020.08)

(58) Field of Classification Search
CPC .......... H04W 52/0212; H04W 52/0216; Y02D 70/00; Y02D 70/1262; Y02D 70/142; Y02D 70/144; Y02D 70/22; Y02D 70/26
See application file for complete search history.

(56) References Cited

U.S. PATENT DOCUMENTS

| | | |
|---|---|---|
| 2005/0208966 A1* | 9/2005 | David ................... H04L 12/12 455/553.1 |
| 2006/0187866 A1 | 8/2006 | Werb |
| 2007/0132426 A1* | 6/2007 | Kim ..................... H01G 9/2031 320/101 |
| 2010/0097969 A1 | 4/2010 | De Kimpe |
| 2013/0182615 A1* | 7/2013 | Sun ................... H04W 52/0219 370/255 |
| 2013/0194994 A1* | 8/2013 | Dayal ............... H04W 72/1215 370/311 |
| 2013/0217332 A1 | 8/2013 | Altman |
| 2013/0343252 A1* | 12/2013 | Chakraborty ..... H04W 52/0261 370/311 |

(Continued)

*Primary Examiner* — Stephen J Clawson
(74) *Attorney, Agent, or Firm* — Polsinelli PC

(57) ABSTRACT

According to one embodiment, a beacon device is configured to provide power in the beacon device in response to a signal from a clock to enter a wake state from a sleep state. The beacon device is further configured to receive configuration parameters over the wireless network interfaces from a network device, monitor one or more of a beacon sensor or a user device over the wireless network interfaces according to the configuration parameters, transmit data over the network interfaces to the network device according to the configuration parameters, and monitor the clock for a signal to enter a sleep state. The beacon device is further configured to disrupt the power in the beacon device in response to the signal to enter the sleep state from the clock.

20 Claims, 11 Drawing Sheets

(56) References Cited

U.S. PATENT DOCUMENTS

| | | |
|---|---|---|
| 2015/0065161 A1 | 3/2015 | Ganesh |
| 2015/0103818 A1 | 4/2015 | Kuhn |
| 2015/0172391 A1 | 6/2015 | Kasslin |
| 2015/0358777 A1 | 12/2015 | Gupta |
| 2016/0119969 A1* | 4/2016 | Vajapeyam ........... H04W 24/10 370/329 |
| 2016/0127875 A1 | 5/2016 | Zampini |
| 2016/0146495 A1 | 5/2016 | Malve |

* cited by examiner

500

| | | |
|---|---|---|
| REMOTE MGMT INTERFACE | DEVICE 401 CONFIG. ▽ | |
| NETWORK-WIDE | CURRENT CONFIGURATION ▽ | |
| WIRELESS | POWER/HIBERNATION PARAMETERS | SENSOR PARAMETERS |
| ORGANIZATION | WAKE TIME/DAY: 5h 0m<br>TIMES: 0600-0900<br>　　　　　1300-1600 | TEMP. SENSOR　: ON<br>TIMES: 0630-0700<br>　　　　　－ |
| HELP | SLEEP TIME/DAY: 19h 0m<br>TIMES: 0901-1259<br>　　　　　1601-0559 | HUMID. SENSOR : ON<br>TIMES: 0800-0805<br>　　　　　1650-1651 |
| ADMIN | Tx POWER: 50 mW<br>Tx FREQUENCY: 2.4 GHz<br>Tx INTERVAL: 100 ms | VIB. SENSOR　　: OFF<br>TIMES: 0800-0805<br>　　　　　1650-1651 |
| | SCHEDULING PARAMETERS | PING/ADVERTISEMENT PARAMS. |
| | Tx TIMES: 0601-0603<br>　　　　　0859-0900 | PREAMBLE<br>UUID<br>MAJOR<br>MINOR<br>SCANNING<br>MAC ADDRESS<br>BEACON PREFIX<br>TX POWER<br>CRC |

| REMOTE MGMT INTERFACE | NETWORK ANALYTICS ▽ | | For the last week ▽ | | |
|---|---|---|---|---|---|
| NETWORK-WIDE | Search clients ... ▽ | 1423 client devices | | | |
| WIRELESS | CLIENT NAME | LAST SEEN | USAGE | OS | IPv4 ADDRESS |
| ORGANIZATION | MOBILE 1 | 4 AUG 12:01 \| D105 | 104 Mb | Android | 192.168.0.0 |
| HELP | MOBILE 2 | 3 AUG 04:01 \| D105 | 20 Mb | OS 10.7 | 192.168.1.1 |
| ADMIN | MOBILE 3 | 3 AUG 06:01 \| D110 | 46 Mb | WIN 8 | 192.168.1.2 |
| | TABLET 1 | 2 AUG 09:01 \| D107 | 958 Mb | OS 10.2 | 192.168.2.1 |
| | LAPTOP 1 | 6 AUG 22:01 \| D106 | 256 Mb | WIN 8 | 192.168.2.2 |
| | ... | ... | ... | ... | ... |

FIG. 10

LOW POWER WIRELESS COMMUNICATION DEVICE AND REMOTE MANAGEMENT TECHNIQUES

CROSS-REFERENCE TO RELATED APPLICATIONS

This application is a continuation of U.S. patent application Ser. No. 15/012,461 filed on Feb. 1, 2016, the contents of which is incorporated by reference in its entirety.

TECHNICAL FIELD

The present disclosure relates generally to wireless communication systems, and more particularly, to low power wireless communication devices and remote management thereof.

BACKGROUND

Electronic devices are a ubiquitous part of modern life and provide new opportunities and vehicles for businesses to communicate with perspective customers. For example, businesses such as retail stores, often deploy an infrastructure of wireless devices, such as beacon devices, to wirelessly send messages to user devices (e.g., mobile phones, digital media players, laptops, wearable smart-devices, etc. In turn, user devices can receive and interpret such messages using an appropriate application. For example, some messages can cause the user devices to display notifications such as rewards, coupons, sale event information, and the like. In addition, the user devices can send messages to the wireless beacons and provide consumer data, such as a time spent at a location, store navigation habits, purchases, consumer profile information, and the like.

However, spacing and density considerations for the underlying infrastructure of wireless devices at a given business location often affects access, availability, bandwidth, and other aspects of the wireless networks. For example, some spacing and density considerations include access to power, interference caused by neighboring devices, bandwidth optimization, and the like. Conventional techniques that attempt to address such spacing and density considerations often employ battery powered (e.g., coin-cell) beacons, which may require time-consuming maintenance (e.g., manual programming, battery replacement, unit replacement, etc.).

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example view of a remote management interface for beacon devices in a network, particularly from the perspective of the cloud controller;

FIG. 10 illustrates another example view of the remote management interface shown in FIG. 5, showing network analytics for the network;

DESCRIPTION OF EXAMPLE EMBODIMENTS

Overview

Figure 1:
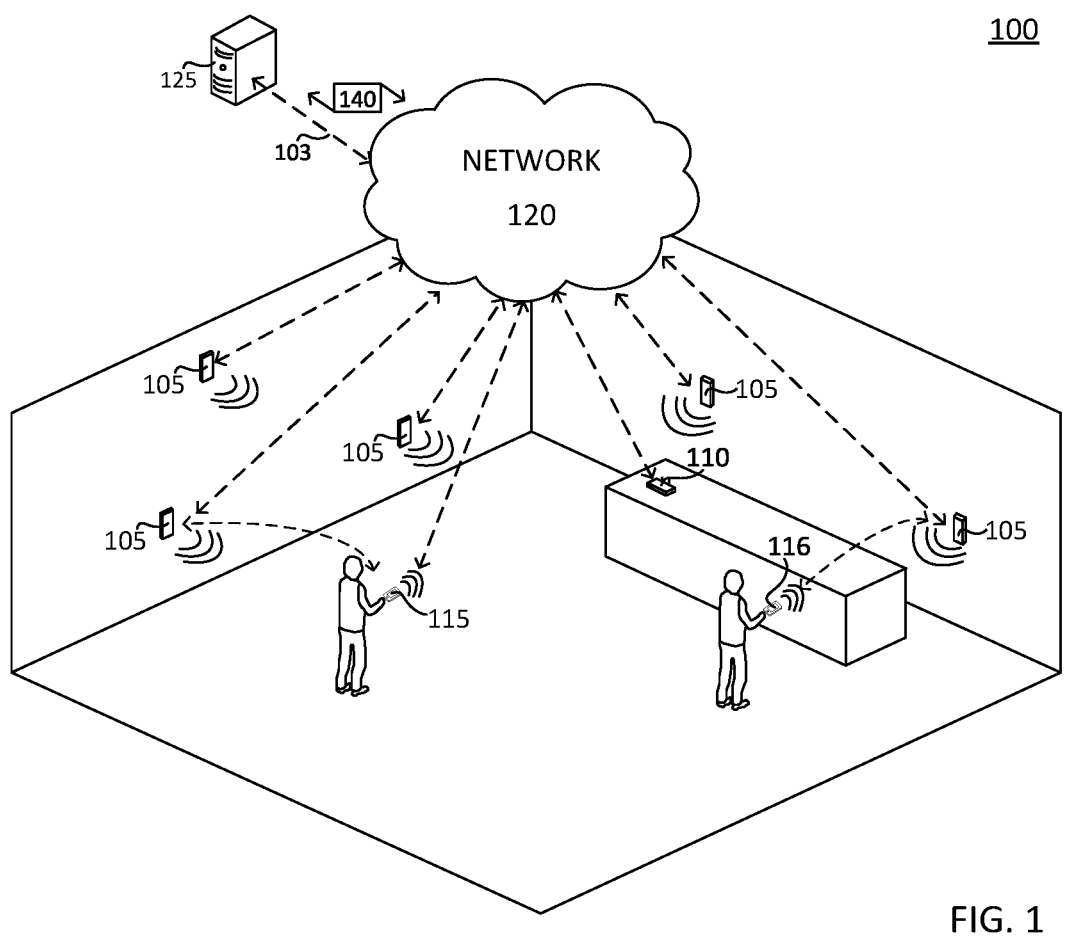
FIG. 1 illustrates a schematic diagram of an example communication network, showing example network devices/nodes, including beacon devices, a cloud controller device, and user devices.

The subject disclosure provides low power communication devices as well as techniques for remote management. For example, a beacon device, according to one or more embodiments of this disclosure, includes a clock, a processor, and a wireless network interface. Power is provided in the beacon device in response to a signal from a clock to enter a wake state. Notably, the wake state enables operations by the processor and communication over the wireless network interface. The beacon device receives configuration parameters such as hibernation parameters and scheduling parameters over the wireless network interface from a network device (e.g., a remote device, a cloud controller, etc.). The beacon device further monitors one or more of a beacon sensor or a user device (e.g., a mobile device) over the wireless network interface according to the configuration parameters, and transmits data for the beacon sensor or the user device over the network interface to the network device according to the scheduling parameters. The beacon device also monitors the clock for a signal to enter a sleep state according to the hibernation parameters. Notably, the sleep state disables the operations by the processor and the communication over the wireless network interface. Power is disrupted in the beacon device in response to the clock signal to enter the sleep state.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A communication network is a geographically distributed collection of nodes or devices interconnected by communication links and segments for transporting data. Such nodes or devices can include, for example, network infrastructure devices (e.g., access points, servers, routers, gateways, etc.), personal devices (e.g., computers, workstations, mobile devices/phones, digital media players, laptops, wearable smart-devices, etc), and other sensor devices. Many types of networks are available, ranging from local area networks (LANs) to wide area networks (WANs). LANs typically connect the nodes over dedicated private communication links located in the same general physical location, such as a building or campus. WANs, on the other hand, typically connect geographically dispersed nodes over long-distance communication links, such as common carrier telephone lines, optical lightpaths, synchronous optical networks (SONET), synchronous digital hierarchy (SDH) links, or Powerline Communication (PLC) such as IEEE 61334, IEEE P1901.2, and others. In addition, other networks can include a Mobile Ad-Hoc Network (MANET), which is a kind of wireless ad-hoc network that includes a self-configuring network of mobile routes (and associated hosts), as well as smart object networks (e.g., sensor networks), which include spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure (AMI) applications) temperature, pressure, vibration, sound, radiation, motion, pollutants, etc. Smart object nodes/devices that form the sensor network may generally be equipped with a radio transceiver or other network interfaces (e.g., PLC ports, etc.), a processor/microcontroller, and an energy source, such as a battery. Often, smart object networks are considered field area networks (FANs), neighborhood area networks (NANs), etc. Generally, size and cost constraints for smart object nodes (e.g., sensors) impact resources such as energy, memory, computational speed and bandwidth.

FIG. 1 illustrates a schematic diagram of an example communication system 100, illustratively comprising nodes/devices interconnected over a network 120 using various methods of communication. As shown, the nodes/devices include beacon devices 105, an access point device 110 (e.g., a router, switch, server, etc.), user devices 115/116 (e.g., mobile phones, etc.), and a cloud controller 125 (e.g., a remote network device, cloud-based device, etc.). Each node/device is operatively interconnected over network 120 through respective communication links 103, which may include wired links or shared media (e.g., wireless links, PLC links, etc.). Notably, certain nodes, such as certain beacon devices 105, may also be in direct communication with other nodes, such as user devices 115/116, depending on distance, signal strength, operational status, location, etc. Those skilled in the art will understand that any number of nodes, devices, links, etc. may be used in communication system 100, and that the view shown herein is for simplicity. Also, those skilled in the art will further understand that while communication system 100 is shown in a certain orientation, particularly showing one network 120, such network configuration may also include multiple other networks, sub-networks, and/or networks that support hybrid communication modalities (e.g., wireless mesh networks, fiber networks, PLC networks, etc.) as appropriate.

Data packets 140 (e.g., traffic and/or messages) may be exchanged among the devices in network 120 using, for example, predefined network communication protocols such as wired protocols, wireless protocols (e.g., IEEE Std. 802.15.4, WiFi, Bluetooth®, Bluetooth low energy (BLE), cellular network protocols (e.g., 3G, LTE, etc.)), PLC protocols, or other shared-media protocols where appropriate. In this context, a protocol consists of a set of rules defining how the devices interact or communicate with each other.

In addition, cloud controller 125, as discussed above, may include one or more cloud based devices that operatively provide instructions to devices in network 120 (e.g., beacon devices 105, access point device 110, etc.). Cloud controller 125 can be configured to manage operations of individual network devices including power levels, hibernation, transmission scheduling, and the like.

Figure 2:
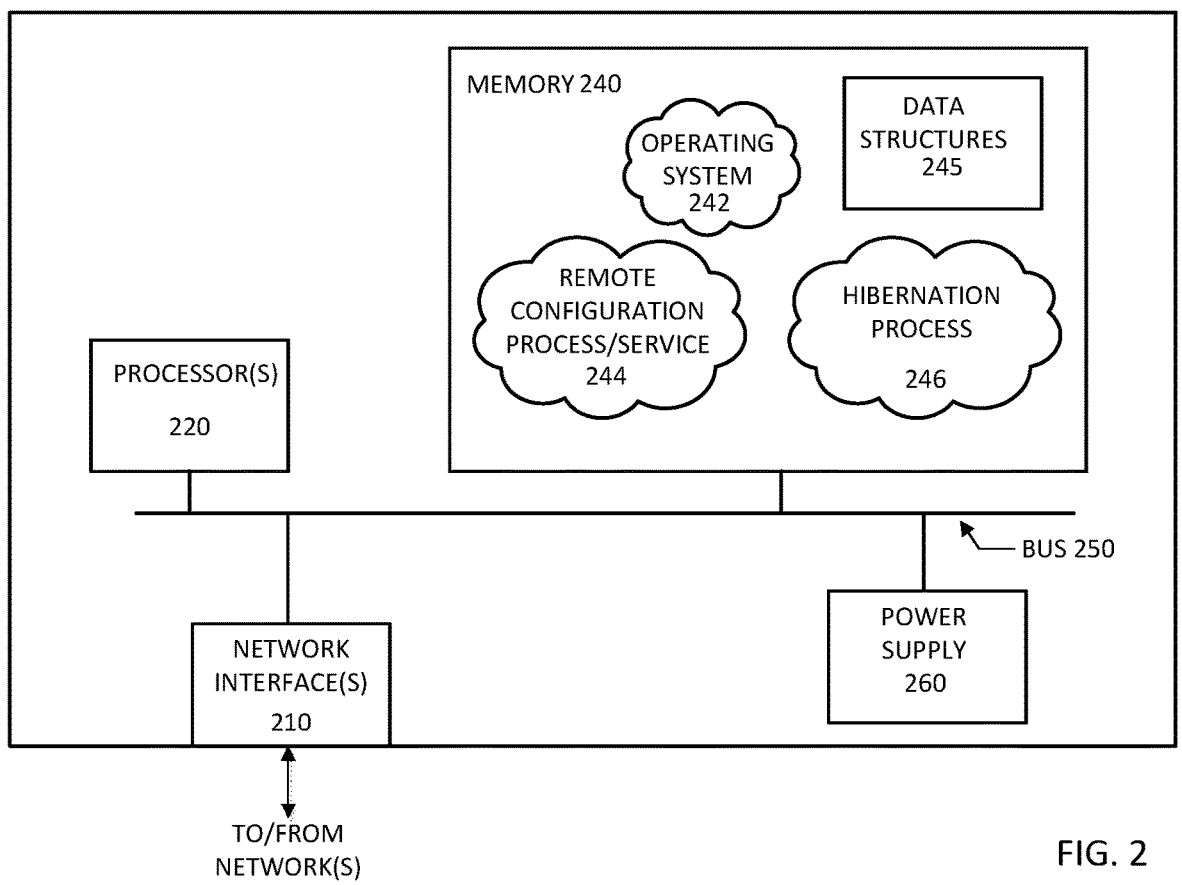
FIG. 2 illustrates a schematic diagram of one example network device/node shown in FIG. 1.

FIG. 2 illustrates a schematic diagram of an example node/device 200 that may be used with one or more embodiments described herein, e.g., as any of the nodes shown in FIG. 1 above. As shown, device 200 includes one or more network interfaces 210 (e.g., wired, wireless, PLC, etc.), at least one processor 220, and a memory 240 interconnected by a system bus 250, as well as a power supply 260 (e.g., battery, plug-in, etc.).

Network interfaces 210 contain mechanical, electrical, and signaling circuitry for communicating data, such as data packets 140, over links 103 coupled to network 120. Network interfaces 210 may be configured to transmit and/or receive data using a variety of different communication protocols, as discussed above. Further, in certain embodiments, network interfaces 210 can include multiple types of network connections—e.g., wireless and wired/physical connections. Also, while the network interfaces 210 are shown separately from power supply 260, for PLC protocols, network interfaces 210 may communicate through the power supply 260, or PLC circuitry may be an integral component of the power supply.

Memory 240 comprises a plurality of storage locations that are addressable by the processor 220 and network interfaces 210 for storing software programs and data structures associated with the embodiments described herein. Notably, in certain embodiments, certain devices may have limited memory or no memory (e.g., no memory for storage other than for programs/processes operating on the device and associated caches). Processor 220 may comprise hardware elements or hardware logic adapted to execute the software programs and manipulate data structures 245. An operating system 242, portions of which are typically resident in memory 240 and executed by the processor, functionally organizes the device by, inter alia, invoking operations in support of software processes and/or services executing on the device. These software processes and/or services may comprise a remote configuration process 244, and a hibernation process 246, as described herein. Note that while remote configuration process 244 and hibernation process 246 are shown in centralized memory 240, alternative embodiments provide for these process to be operated within network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Remote configuration process 244 and hibernation process 246 particularly contain computer executable instructions executable by processor 220 to perform various functions, as described herein. For example, remote configuration process 244 may cause processor 220 to perform functions according to one or more routing protocols, as will be understood by those skilled in the art. These functions may, on capable devices, be configured to manage a routing/forwarding table (a data structure 245), send/receive ping or echo messages (e.g., using Internet Control Message Protocol (ICMP)), manage scheduling tables for data transmission, and the like. Notably, on devices not capable or configured to store routing entries, remote configuration process 244 may consist solely of providing mechanisms necessary for source routing techniques. That is, for source routing, other devices in the network can instruct such less capable devices where to send data packets, and the less capable devices simply forward the packets as instructed.

Figure 3:
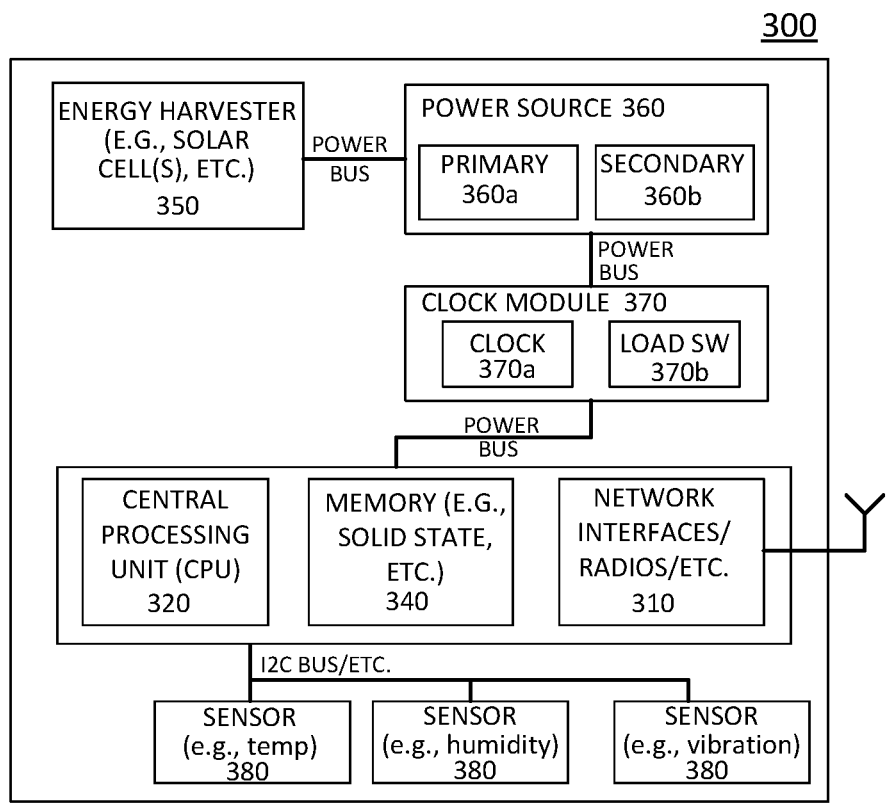
FIG. 3 illustrates a schematic diagram of another embodiment of one example network device/node shown in FIG. 1.

FIG. 3 illustrates a schematic diagram of another example node/device 300 that may be used with one or more embodiments described herein, e.g., as one of beacon devices 105 and/or access point device 110. As shown, device 300 includes an energy harvester 350 coupled to a power source 360 (e.g., a battery) by a power bus. Energy harvester 350 can include, for example, electrical and/or mechanical circuitry that converts energy inputs such as solar, wind, vibration, etc., into electrical power. Power source 360, as shown, includes a primary power source 360*a* and a secondary power source 360*b*, which power sources can include various combinations of rechargeable batteries, non-rechargeable batteries, other solid state energy storage components, and the like.

Power source 360 is further coupled to a clock module 370 by another power bus. Clock module 370 can include, for example, a real-time clock 370*a* and a load switch 370*b*. Operatively, clock module 370 keeps a time for device 300 and signals for device 300 to enter a wake state or a sleep state according to its configuration parameters. For example, clock module 370 can include low power or ultra-low power processing functionality that triggers load switch 370*b* to provide (or disrupt) power between power source 360 and other circuitry/modules/sensors/etc. based on a signals from clock 370*a*.

Other circuitry/modules may include, for example, a central processing unit (CPU) 320, a memory 340, network interfaces 310 (e.g., radios, transceivers, etc.) and sensors 380. CPU 320, memory 340, and network interfaces 310 may operate similar to corresponding circuitry discussed above with for device 200 (e.g., processor 220, network interfaces 210, memory 240). By way of example, network interfaces 310 (similar to network interfaces 210) include mechanical, electrical, and signaling circuitry for communicating data over a network. Such network interfaces 310 may be configured to transmit and/or receive data using a variety of different communication protocols, including wired and wireless protocols, discussed above.

Further, sensors 380, as shown, can function to monitor physical or environmental conditions such as those discussed above for smart objects (e.g., energy/power consumption, water, gas, temperature, pressure, vibration, radiation, motion, and the like). In addition, sensors 380 typically communicate with CPU 320, memory 340, and/or network interfaces 310 over an Inter-Integrated Circuit (I2C) bus.

Further, although device 300 is shown with a particular configuration, including buses, modules and the like, such configuration is shown for purposes of discussion, not limitation. It is appreciated that various modules may incorporate (or exclude) certain functionality of other modules discussed herein. For example, in some embodiments, power source 360 may incorporate functionality of clock module 370 and operate to provide (or disrupt) power in device 300.

As noted above, electronic devices are a ubiquitous part of modern life and provide new opportunities or vehicles for business to communicate with perspective customers. However, spacing and density considerations for a location often impact design and deployment of the underlying infrastructure of wireless devices. Further, configurations that incorporate beacons powered by coin-cell batteries often result in time-consuming maintenance (e.g., replacement).

According to one or more embodiments disclosed herein, the beacon devices, such as the illustrative devices 200/300 noted above, operate in conjunction with the remote management techniques to address the spacing and density considerations as well as obviate time-consuming maintenance. In addition, the beacon devices and remote management techniques also support optional sensor monitoring functionality (e.g., physical/environmental conditions, etc.) in addition to conventional beacon communication (e.g., ping messages).

Specifically, a system according to one or more embodiments discussed herein, includes a cloud controller (e.g., cloud controller 125 and/or device(s) 200/300) that operatively manages each beacon device (e.g., device(s) 200/300) in a communication network (e.g., network 120) using configuration parameters that are wirelessly transmitted with respective beacon devices. These configuration parameters can include, for example, hibernation parameters/processes (e.g., duty cycling awake/sleep times), scheduling parameters for data transmission, power parameters (e.g., transmission power), sensor monitoring, ping messaging, and the like.

With respect to the beacon devices, and particularly referring to beacon device 300 noted above, each beacon device can include a real-time clock 370*a* having an integrated or built in load switch 370*b* that operates as a power cutoff (e.g., providing/disrupting power) between a power source 360 and other power "intensive" circuitry or modules, such as CPU(s) 320, memory, network interfaces 310, sensors 380, and the like. In this fashion, the beacon devices drastically reduce power usage in a sleep state. Operatively, clock module 370 is configured to trigger load switch 370*b* based on a signal from clock 370*a*, which can electrically couple or de-couple power source 360 to/from CPU 320 and/or other circuitry (e.g., network interfaces 310, memory 340, etc.). That is, load switch 370*b* operates to open or close an electrical path between power source 360 and CPU 320 (or other circuitry). Based on this electrical coupling/decoupling, the beacon device operates in a sleep state or a wake state. In the wake state, CPU 320 can be configured to wirelessly request configuration parameters (and/or updated configuration parameters as appropriate) from the cloud controller. Further, based on the configuration parameters (e.g., hibernation processes/parameters), CPU 320 can reset and/or otherwise adjust clock module 370 to trigger load switch 370*b* based on a signal from clock 370*a* (e.g., to schedule a subsequent sleep state, etc.). In this fashion, CPU 320 can map signals from clock 370*a* to enter the wake/sleep state(s).

In the wake state, CPU 320 operates according to its configuration parameters and, for example, sends/receives data, monitors sensors, etc. Moreover, as noted above, the beacon devices can also include an energy harvester 350 that converts energy from renewable energy sources such as solar (e.g. solar cell(s)), wind (e.g., turbines), vibration (mechanical-electrical systems), radio-frequency (RF), and the like, into electrical power. This electrical power may be stored in a power source 360 (e.g., rechargeable batteries) thereby effectively obviating time-consuming battery (or unit) replacement. In some embodiments, power source 360 may rectify or otherwise convert (e.g., rectify, etc.) the electrical power from the renewable energy sources and function as a pass-through when the beacon device operates in a wake state.

Figure 4:
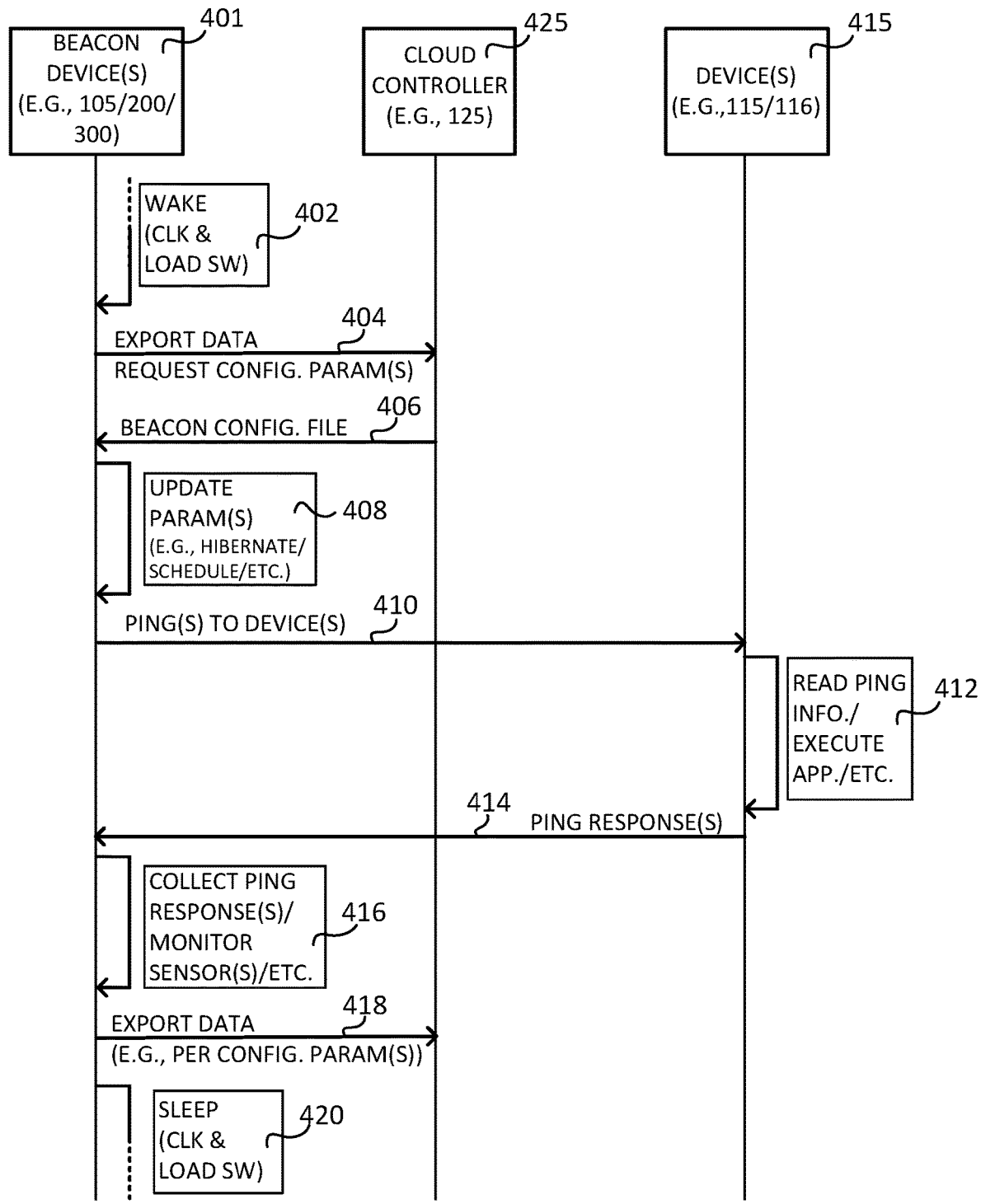
FIG. 4 illustrates a signaling diagram, showing communication between a beacon device, the cloud controller, and a user device.

FIG. 4 illustrates a signaling diagram 400 illustrating communication between a beacon device 401 (e.g., device(s) 200/300), a cloud controller 425 (e.g., cloud controller 125) and user device(s) 415 (e.g., user devices 115/116).

As shown in signaling diagram 400, beacon device 401 operates in a sleep state until a clock generates a signal for beacon device 401 to enter a wake state. In particular, beacon device 401 enters a wake state at 402, which causes beacon device 401 to enable operations by a processor (e.g., a CPU, microprocessor, etc.) as well as communication over wireless network interface(s). Further, as discussed above, beacon device 401 can enter the wake state when a clock signal triggers a load switch to couple the processor/network interface(s)/etc. to a power source. Notably, beacon device 401 enters wake/sleep states based on its configuration parameters, which operatively instruct a clock module to trigger a load switch to provide or disrupt power for the processor/network interface/sensors/etc.

In the wake state, beacon device 401 exports data and requests configuration parameters (or updated configuration parameters) from cloud controller at 404. Here, beacon device 401 can export previously collected data (e.g., data that was not transmitted prior to the sleep state), and request configuration parameters which may include hibernation parameters/processes (e.g., duty cycling awake/sleep times), scheduling parameters for data transmission, power parameters (e.g., transmission power), sensor monitoring, ping messaging, and the like.

Cloud controller 425 receives the data and configuration parameter request from beacon device 401 and, in response, cloud controller 425 sends (at 406) a beacon configuration file to beacon device 401. The beacon configuration file includes the various configuration parameters discussed herein. In some embodiments, cloud controller 425 only sends updated configuration parameters to beacon device 401, which may be included in the beacon configuration file and/or may be sent in a different format.

Beacon device 401 receives the beacon configuration file and updates, at 408, its configuration parameters as discussed herein. For example, beacon device 401 can be configured, according to the configuration parameters in the beacon configuration file, to continuously send ping messages at a prescribed power setting and for a particular time period. In some embodiments, the beacon device can also be configured to detect a proximity of user devices 115/116 prior to sending ping messages. Notably, it is appreciated that cloud controller 425 may operate in cooperation with user device 415 to provide configuration/updated configuration parameters to beacon device 401.

As shown, beacon device 401 sends ping messages at 410 to user device 415. As noted above, user device 415 can run an application that interprets such ping messages and perform (or execute) additional operations, shown at 412. For example, in response to a ping message, user device 415 may display alerts, notifications, and the like and/or send consumer data back to beacon device 401 (e.g., ping response), shown at 414.

At 416, beacon device 401 collects responses to ping messages (e.g., stores data from responses in memory), monitors one or more sensors, and/or performs other functions according to its configuration parameters. For example, beacon device 401 can export data (e.g., log files, etc.) from the responses, sensors, etc., to cloud controller 425, shown at 418. In some embodiments, beacon device 401 can export a beacon status report file, which includes a health and status of the beacon device. In addition, in some embodiments, beacon device 401 may be configured to export or transmit data to a user device, which cooperates with cloud controller 125 and retransmits the data from beacon device 401 to cloud controller 425, as discussed above. Such embodiments may provide additional power reduction for beacon device 401, since beacon device 401 need only transmit data to user devices in close proximity.

As mentioned above, beacon device 401 may monitor (e.g., by the clock module) the clock for a signal to enter the sleep state (e.g., according to the hibernation parameters). At 420, the clock module identifies the signal from the clock to enter the sleep state and triggers the load switch to disrupt or decouple power between the processor/network interface/sensors/etc. and the power source. In the sleep state, beacon device 401 disables operations by the processor and disables communication over the network interfaces to reduce power usage.

FIGS. 5-10 illustrate various views of an example remote management interface 500 (e.g., a dashboard, graphical user interface (GUI), etc.), particularly from the perspective of a cloud controller—here, cloud controller 425. As discussed in greater detail below, FIGS. 5-10, collectively, illustrate techniques for remotely managing devices, including beacon devices (e.g., devices 105, 200, 300, 401, etc.), access points (e.g., access point device 110), and other network devices (e.g., switches, routers, gateways, etc.), in a communication network (e.g., network 120). Moreover, discussion of FIGS. 5-10 particularly reference beacon device 401, cloud controller 425, and user device 415, however it is appreciated that such discussion is for convenience and not meant to limit applicability to other devices/techniques of this disclosure.

FIG. 5 illustrates an example view of remote management interface 500 for beacon devices in a wireless network, particularly showing remote configuration options. In particular, remote management interface 500 illustrates a current configuration for beacon device 401, including power/hibernation parameters, scheduling parameters, sensor parameters, and ping/advertisement parameters. For example, a network operator can use remote management interface 500 to configure one or more beacon devices to operate at specific time periods (e.g., within business hours), monitor a specific set of sensors, and adjust transmission power, adjust a frequency of monitoring (e.g., every 10 seconds, etc.), set/re-set sleep/wake states, and configure various other parameters. Notably, as discussed above, a beacon device 401 may be configured to automatically request configuration parameters and/or updated configuration parameters at specific times (e.g., after entering the wake state, during wake state operations, etc.). In this fashion, cloud controller 425 wirelessly manages each beacon device in a network, without requiring a hardwired connection.

Figure 6:
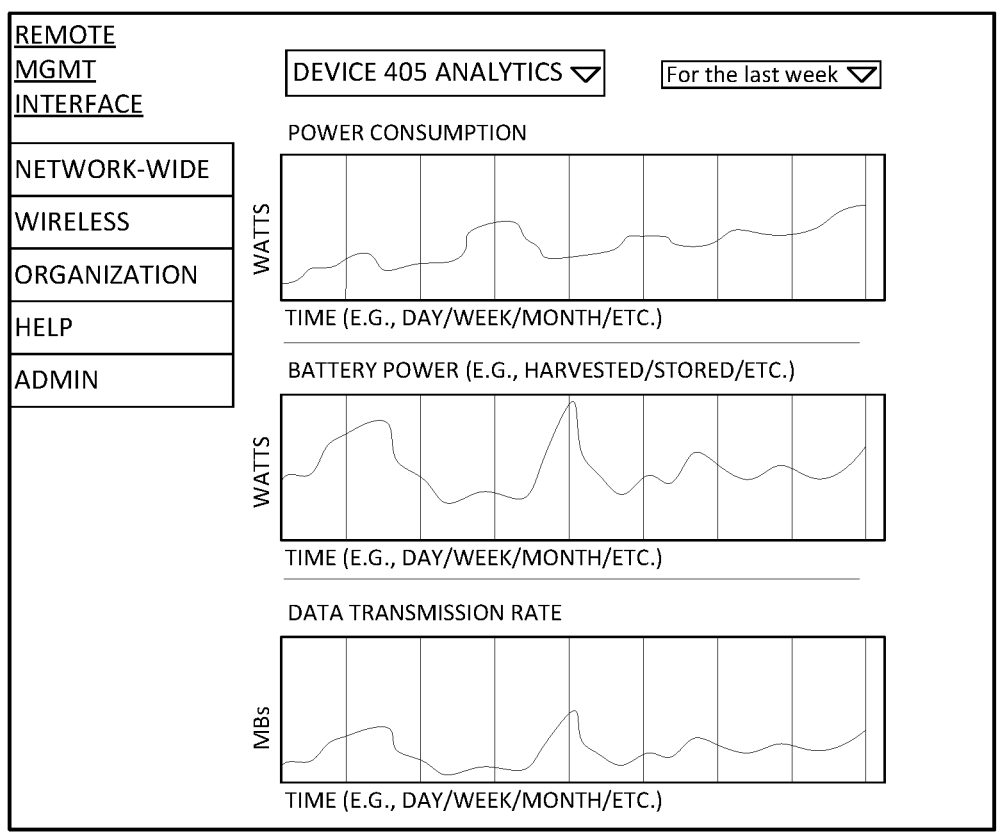
FIG. 6 illustrates another example view of the remote management interface shown in FIG. 5, showing device analytics.

FIG. 6 illustrates another example view of remote management interface 500, showing analytics for device 405. As discussed above, beacon device 405 can be configured to collect and/or monitor data regarding health, status, user devices, consumers, sensors, and the like, and also store such data in memory (e.g., in log files). In certain embodiments, beacon device 405 may be configured to cache and transmit such data without storing it in its memory. Operatively, cloud controller 425 receives and aggregates the beacon device data (e.g., log files, cached data, etc.), and may further analyze and display the data in graphs, charts, or other analytic/diagnostic information in remote management interface 500. For example, remote management interface 500 in FIG. 6 provides graphs for power consumption, battery power, and data transmission rates of beacon device 405. Notably, the graphs, charts, and analytic/diagnostic information shown in FIG. 6 are examples, and are not mean to limit the type or quantity of analytic/diagnostic information that remote management interface 500 may display. For example, other information may include memory for a device, RF interference, and other analytic/diagnostic information. Further, while FIG. 6 provides analytic/diagnostic information for a single device, it is appreciated that data from a set of devices may be provided, as is appreciated by those skilled in the art.

Figure 7:
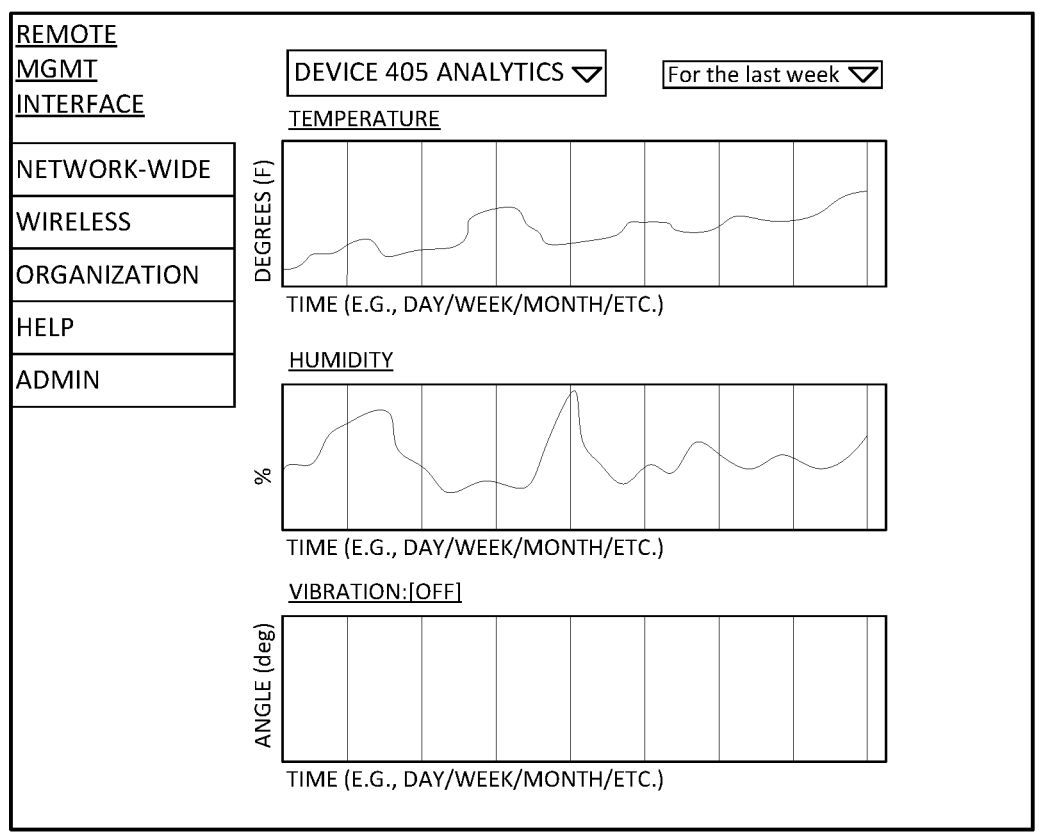
FIG. 7 illustrates another example view of the remote management interface shown in FIG. 5, showing device analytics for one or more sensors of one beacon device.

FIG. 7 illustrates another example view of remote management interface 500, showing device analytics for sensors of beacon device 405. As shown, device 405 includes sensors to monitor temperature, humidity and vibration. However, per its configuration parameters, device 405 only operates (e.g., provides power and/or monitors) sensors for temperature and humidity. As discussed above, beacon device 405 may be equipped with multiple sensors to monitor physical or environmental conditions. Remote management interface 500 provides flexibility to remotely configure beacon devices to only operate a desired set of sensors, using the configuration parameters. In addition, this flexibility can include operating each sensor at a different time intervals.

Figure 8:
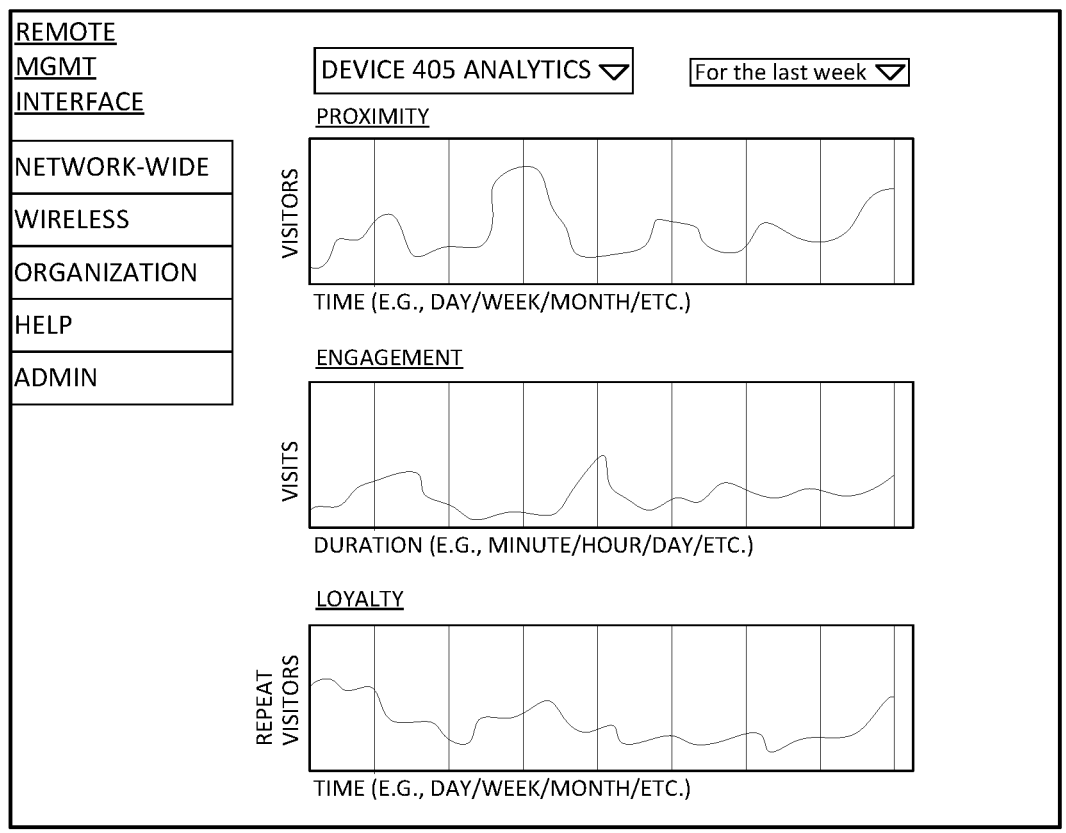
FIG. 8 illustrates another example view of the remote management interface shown in FIG. 5, showing device analytics for one or more user devices in the network.

FIG. 8 illustrates another example view of remote management interface 500, showing device analytics for one or more user devices in the network. As mentioned, beacon devices 405 may be configured to monitor and/or collect consumer data from respective user devices (e.g., user devices 115/116). This consumer data can include, for example, a number of visitors in proximity for a time period, an engagement metric, which indicates a time a visitor remained at a location (or in a store), and a loyalty metric, which indicates a number of repeat visitors for a time period. Notably, the consumer data and associated metrics shown in FIG. 8 are examples only, and are not meant to limit the type or scope of consumer data and/or associated metrics for this disclosure. Any type of consumer data and/or any number of associated metrics may be provided by remote management interface 500, as is appreciated by those skilled in the art.

Figure 9:
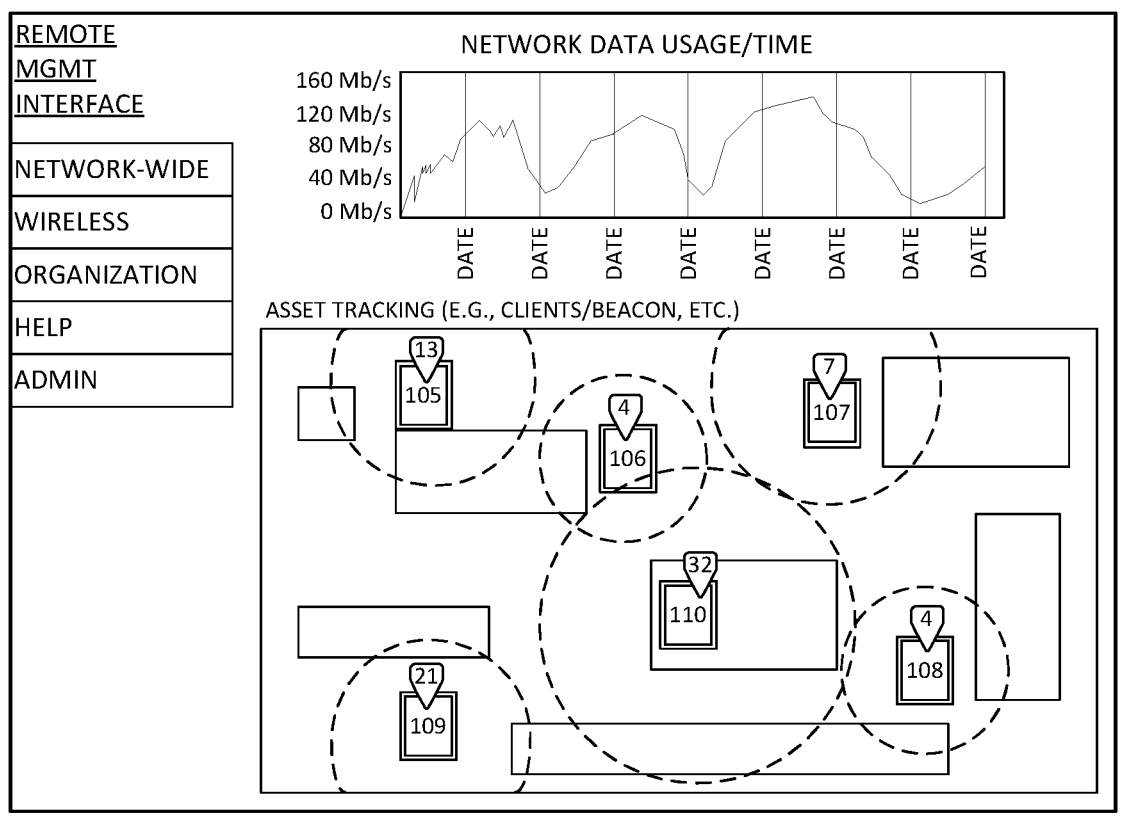
FIG. 9 illustrates another example view of the remote management interface shown in FIG. 5, showing asset tracking for devices in the network.

FIG. 9 illustrates another example view of remote management interface 500, showing asset tracking for devices in the network (e.g., network 120). Here, remote management interface 500 provides a graph illustrating network data usage (e.g., Mb/s) for a date ("DATE"), and also provides a schematic view of network 120, including beacon devices 105 and access point device 110. In addition, beacon devices 105 and access point device 110 include "tags" or notifications that display a number corresponding to a number of user devices in respective proximity (e.g., for a time period). In some embodiments, remote network interface 500 provides active links to each tag such that a network operator can select a tag and obtain additional information for the respective device (e.g., drill down for particular metrics, etc.).

FIG. 10 illustrates another example view of remote management interface 500, particularly showing network analytics for network 120. Here, remote management interface 500 provides a list of identified user devices (e.g., "clients") as well as corresponding data regarding "last seen", "usage", operating system types ("OS"), and "IPv4 address". These network analytics are shown for a period of time "for the last week", which may be adjusted as appropriate.

Figure 11:
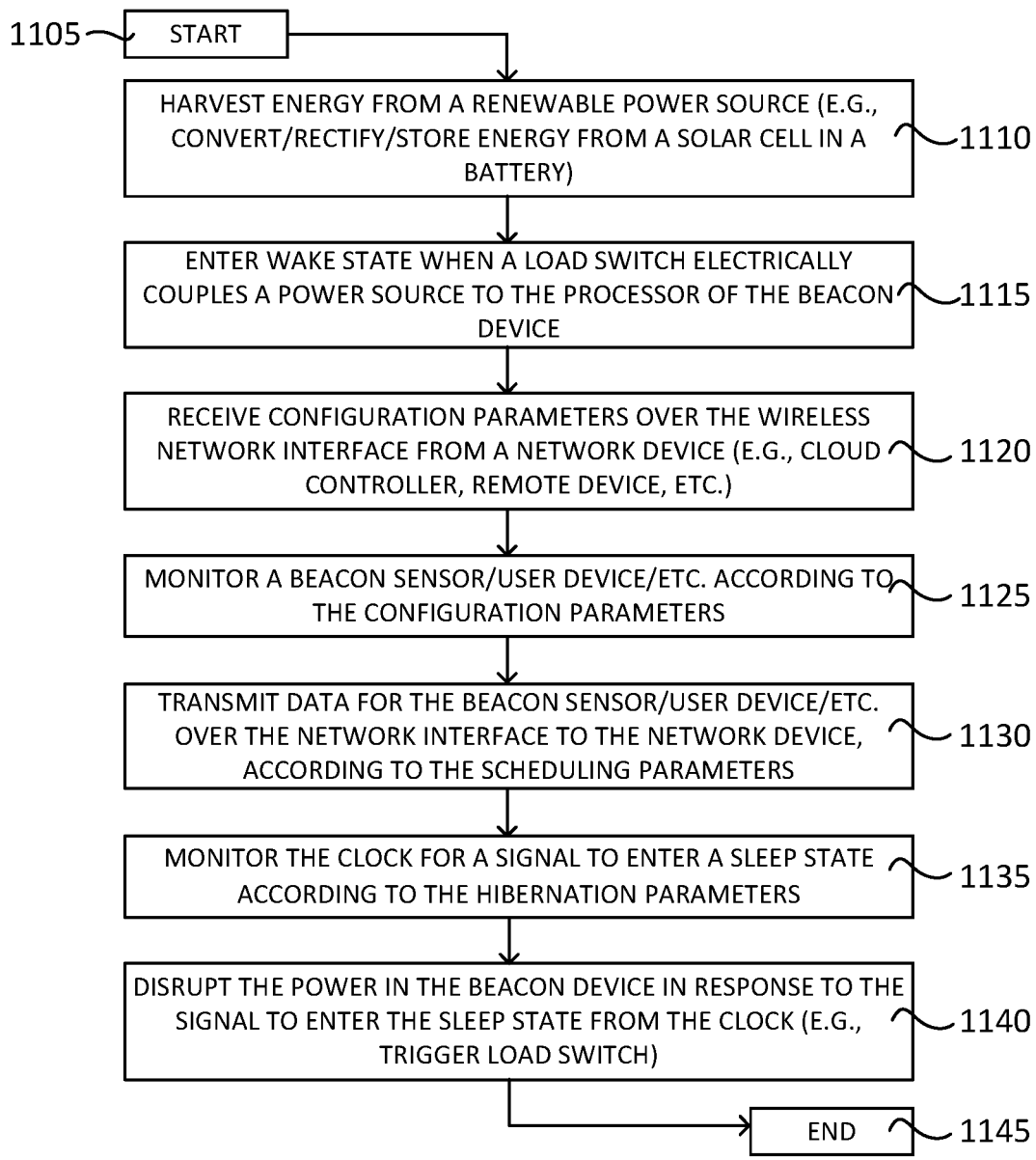
FIG. 11 illustrates an example simplified procedure for dynamically enabling routing devices in a shared-media communication network.

FIG. 11 illustrates an example simplified procedure 1100 for remote management of beacon devices in a wireless network, particularly from the perspective of a beacon device. For instance, as discussed, beacon devices in a network can wirelessly receive configuration parameters from a cloud controller and perform various operations according to the configuration parameters as shown in procedure 1100

In particular, procedure 1100 begins at step 1105 and continues on to step 1110 where, as discussed above, the beacon device harvests energy from a renewable power source. For example, the beacon device can include solar cells, turbines, other electrical-mechanical circuitry, and the like, to convert energy from solar, wind, vibration, etc., into electrical power. Typically, the beacon device stores this power in one or more power supplies such as a re-chargeable battery, but in certain embodiments, the beacon device can pass the converted power directly through to certain circuitry (e.g., a processor/network interface(s), etc.) when it operates in a wake state.

At step 1115, the beacon device enters the wake state when, for example, a load switch electrically couples a power source to the processor. As mentioned above, the beacon device can include a clock module having a real-time clock and a load switch. The clock modules operates as an electrical cut-off to power the beacon device "on" in a wake state or "off" in a sleep state. In the wake state, the beacon device enables operations by the processor and communications over wireless network interface(s)/radios/etc. Further, depending on prior configuration parameters, the beacon device may (e.g., by default) transmit a request for configuration parameters (or updated configuration parameters) upon entering the wake state. For example, the beacon device may wirelessly transmit such request to another network device such as the cloud controller (e.g., a remote device, a cloud-based device, etc.). However, as noted above, in certain embodiments, other devices such as user devices (e.g., mobile phones) may cooperate with the cloud controller to communicate configuration parameters between the cloud controller and the beacon device.

The beacon device receives, at step 1120, configuration parameters over the wireless network interface. As discussed above, the configuration parameters can include hibernation parameters (e.g., sleep state/wake state), scheduling parameters, power parameters, ping messaging information, and the like. In some embodiments, the beacon device analyzes the configuration parameters and adjusts a trigger (e.g., a clock signal) for the load switch to electrically couple/decouple the power source to the processor (or other beacon device circuitry).

In the wake state, at step 1125, the beacon device monitors beacon sensors, user devices (e.g., mobile devices) and the like according to the configuration parameters. For example, the beacon device can transmit one or more ping messages over the wireless network interface to user devices, receive one or more response messages over the wireless network interface from the mobile device, and store the response messages (or corresponding data) in a memory of the beacon device. In addition, the beacon device can monitor one or more beacon sensors over an I2C bus, as discussed in greater detail above.

The beacon device transmits data at step 1130 for the beacon sensor, user devices, and the like over the network interface according to the scheduling parameters. Further, the beacon device also monitors the clock for a signal to enter a sleep state (e.g., according to the hibernation parameters). As mentioned above, the sleep state disables the operations by the processor of the beacon device and the communications over the wireless network interface of the beacon device.

In response to the signal to enter the sleep state, the beacon device can trigger the load switch at step 1140 to disrupt power in the beacon device and cause the beacon device to enter the sleep state. For example, the load switch can electrically decouple the power source from the processor and/or the wireless network interface(s)/radios/etc.

Procedure 1100 subsequently ends at step 1145, but may continue on to step 1115 where, as discussed above, the beacon device enters the wake state.

It should be noted that while certain steps within procedure 1100 may be optional, and further, the steps shown in FIG. 11 are merely examples for illustration—e.g., certain other steps may be included or excluded as desired. Further, while a particular order of the steps is shown, this ordering is merely illustrative, and any suitable arrangement of the steps may be utilized without departing from the scope of the embodiments herein.

The devices and techniques described herein, therefore, provide for remote management of beacon devices and address spacing and density considerations as well as obviate time-consuming maintenance. In addition, the devices and techniques also support optional sensor monitoring functionality (e.g., physical/environmental conditions, etc.) in addition to conventional beacon communication (e.g., ping messages).

While there have been shown and described illustrative embodiments that provide for remote management of improved beacon devices, it is to be understood that various other adaptations and modifications may be made within the spirit and scope of the embodiments herein. For example, the embodiments have been shown and described herein with relation communications between a beacon device and a cloud controller. However, the embodiments in their broader sense are not as limited, and may, in fact, be cooperatively communicate with other devices (e.g., user devices) in order to efficiently manage remote beacon devices.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   in response to a first clock signal, enabling a wake state of a beacon device, wherein the wake state enables the beacon device for communication via a network interface of the beacon device;
   receiving, via the network interface from a network device, configuration parameters;
   monitoring, by the beacon device via the network interface, one or more of a beacon sensor or a user device according to the received configuration parameters;
   in response to the monitoring, receiving data from the one or more of the beacon sensor or the user device;
   transmitting, via the network interface to the network device, the data received from the one or more of the beacon sensor or the user device;
   monitoring, by the beacon device, for a second clock signal to enable a sleep state according to the received configuration parameters; and
   in response to the second clock signal, enabling the sleep state of the beacon device, wherein the sleep state disables the communication of the beacon device.

2. The method of claim 1,
   wherein,
      the disabling of the beacon device includes operating the beacon device in the sleep state until a third clock signal to enter the wake state, and
      the beacon device is operated in the wake state until a fourth clock signal.

3. The method of claim 1, wherein the enabling of the communication includes triggering a load switch to electrically couple a power source to a processor of the beacon device.

4. The method of claim 3, wherein the disabling the communication includes triggering the load switch to electrically decouple the power source from the processor.

5. The method of claim 4, wherein the power source includes at least one solar cell and a battery.

6. The method of claim 1, further comprising:
harvesting, by the beacon device, energy from a solar cell,
storing, by the beacon device, the energy from the solar cell in a battery,
providing power in the beacon device by electrically coupling at least one of the solar cell or the battery to a processor of the beacon device, and
disrupting the power in the beacon device by electrically decoupling the at least one of the solar cell or the battery from the processor of the beacon device.

7. The method of claim 1, further comprising:
in response to a third clock signal, enabling a wake state of the beacon device.

8. The method of claim 7, further comprising:
mapping, by the beacon device, the third clock signal to a first trigger for a load switch to electrically couple a power source to a processor of the beacon device according to hibernation parameters; and
mapping, by the beacon device, a fourth clock signal to a second trigger for the load switch to electrically decouple the power source to the processor of the beacon device according to the hibernation parameters.

9. The method of claim 1, further comprising:
adjusting one or more triggers for a load switch of the beacon device to electrically couple or decouple a power source to a processor of the beacon device according to hibernation parameters.

10. The method of claim 1, further comprising:
transmitting a request for new configuration parameters over the network interface in response to a third signal to enter a wake state.

11. The method of claim 1, wherein the monitoring of the one or more of the beacon sensor or the user device comprises:
transmitting, by the beacon device, one or more pings to the user device over the network interface;
receiving, by the beacon device, data for the user device over the network interface in response to the one or more pings; and
storing, by the beacon device, the data for the user device in a memory of the beacon device.

12. A beacon device comprising:
one or more network interfaces to communicate in a communication network;
a memory configured to store one or more processes; and
a processor configured to execute the one or more processes that, when executed, cause the processor to:
in response to a first clock signal, enable a wake state, wherein the wake state enables communication of the beacon device via the one or more network interfaces,
receive, via the one or more network interfaces from a network device, configuration parameters,
monitor one or more of a beacon sensor or a user device over the one or more network interfaces according to the received configuration parameters,
in response to the monitoring, receive data from the one or more of the beacon sensor or the user device,
transmit the data received from the one or more of the beacon sensor or the user device to the network device via one or more of the one or more network interfaces,
monitor for a second clock signal to enable a sleep state according to the received configuration parameters, and
in response to the second clock signal, enable the sleep state of the beacon device, wherein the sleep state disables the communication of the beacon device.

13. The beacon device of claim 12, wherein the one or more processes, when executed, further cause the processor to:
operate the beacon device in the sleep state until a third clock to enter the wake state; and
operate the beacon device in the wake state until a fourth clock signal.

14. The beacon device of claim 12, wherein enabling the communication includes electrically coupling a power source to the processor in response to the beacon device entering the wake state.

15. The beacon device of claim 14, wherein disabling the communication includes electrically decoupling the power source from the processor.

16. The beacon device of claim 12,
wherein the one or more processes, when executed, further cause the processor to:
harvest energy from a solar cell,
store the energy from the solar cell in a battery, and
couple and decouple the solar cell or the battery to the processor.

17. The beacon device of claim 16, wherein coupling and decoupling of the solar cell or the battery to the processor are performed according to hibernation parameters.

18. The beacon device of claim 12, wherein the one or more processes, for monitoring the one or more of the beacon sensor or the user device, when executed, further cause the processor to:
transmit one or more ping messages to the user device over the one or more network interfaces;
receive data for the user device over the one or more network interfaces in response to the one or more ping messages; and
store the data for the user device in the memory.

19. A tangible, non-transitory, computer-readable media having instructions encoded thereon that, when executed by a processor, cause the processor to:
in response to a first clock signal, enable a wake state of a beacon device, wherein the wake state enables the beacon device for communication via one or more network interfaces of the beacon device;
receive, via the one or more network interface from a network device, configuration parameters;
monitor one or more of a beacon sensor or a user device over the one or more network interfaces according to the received configuration parameters;
in response to the monitoring, receive data from the one or more of the beacon sensor or the user device;
transmit, via the one or more network interface to the network device, the data from the one or more of the beacon sensor or the user device;
monitor for a second clock signal to enable a sleep state according to the received configuration parameters; and
in response to the second clock signal, enable the sleep state of the beacon device, wherein the sleep state disables the communication of the beacon device.

20. The tangible, non-transitory, computer-readable media of claim 19, comprising further instructions, for monitoring the one or more of the beacon sensor or the user device, which when executed, causes the processor to:
- transmit one or more ping messages to the user device over the one or more network interfaces;
- receive data for the user device over the one or more network interfaces in response to the one or more ping messages; and
- store the data for the user device in a memory of the beacon device.

\* \* \* \* \*